United States Patent [19]

Betensky

[11] Patent Number: 5,428,480
[45] Date of Patent: Jun. 27, 1995

[54] ZOOM LENS HAVING WEAK PLASTIC ELEMENT

[75] Inventor: Ellis I. Betensky, W. Redding, Conn.

[73] Assignee: Eastman Kodak Company, Rochester, N.Y.

[21] Appl. No.: 17,927

[22] Filed: Feb. 16, 1993

[51] Int. Cl.⁶ .............................................. G02B 9/10
[52] U.S. Cl. .................................. 359/692; 359/708
[58] Field of Search ................ 359/692, 690, 688, 687

[56] References Cited

U.S. PATENT DOCUMENTS

| | | |
|---|---|---|
| 4,720,179 | 1/1988 | Ito . |
| 4,787,718 | 11/1988 | Cho . |
| 4,818,081 | 4/1989 | Ito . |
| 4,830,476 | 5/1989 | Aoki . |
| 4,836,660 | 6/1989 | Ito . |
| 4,854,683 | 8/1989 | Ozawa . |
| 4,889,416 | 12/1989 | Yamada . |
| 4,936,661 | 6/1990 | Betensky et al. . |
| 4,953,957 | 9/1990 | Kobayashi . |
| 4,993,814 | 2/1991 | Hata . |
| 5,162,947 | 11/1992 | Ito ......................................... 359/692 |
| 5,164,859 | 11/1992 | Ito ..................................... 359/692 X |
| 5,218,478 | 6/1993 | Itoh ....................................... 359/692 |
| 5,270,861 | 12/1993 | Estelle .................................. 359/692 |
| 5,270,867 | 12/1993 | Eselle ................................... 359/692 |
| 5,315,440 | 5/1994 | Betensky et al. ................ 359/612 X |

Primary Examiner—Edward K. Look
Assistant Examiner—Michael S. Lee
Attorney, Agent, or Firm—Svetlana Z. Short

[57] ABSTRACT

A zoom lens suitable for an inexpensive camera has a front positive lens group and a rear negative lens group. Both groups move for zooming with the rear negative group providing most of the variation in focal length. The front positive group includes a front negative component and a rear positive component while the rear negative group includes a rear negative component and a weak plastic element having at least one aspheric surface. The plastic element is sufficiently weak that it does not cause variation in focus with normal variations in temperature and relative humidity. All other elements in the zoom lens are glass.

31 Claims, 1 Drawing Sheet

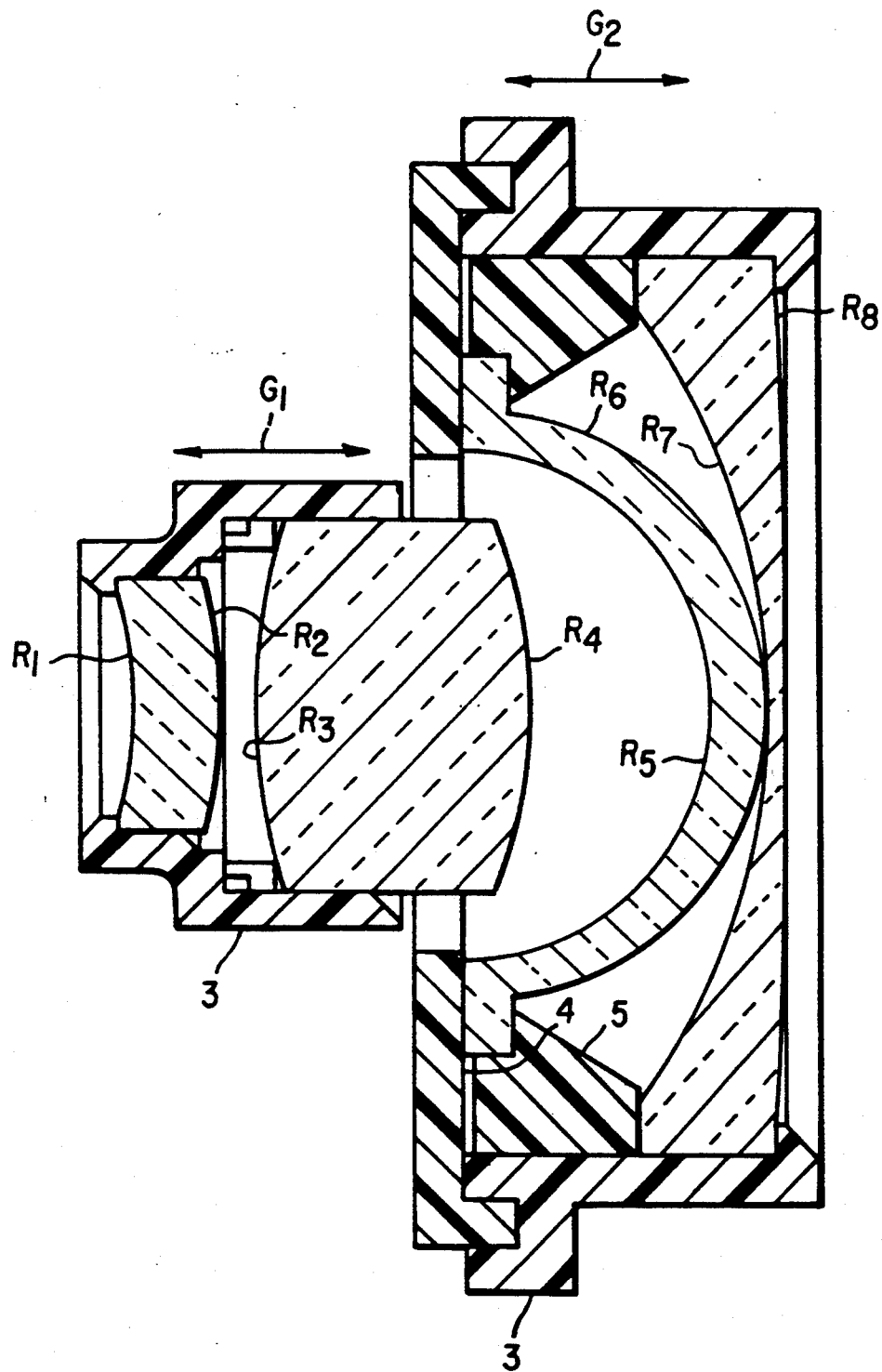

ZOOM LENS HAVING WEAK PLASTIC ELEMENT

RELATED APPLICATION

This application is related to co-assigned U.S. patent application Ser. No. 07/792,504, filed Nov. 4, 1991, entitled ZOOM LENS HAVING WEAK FRONT LENS GROUP, in the name of Betensky et al.

TECHNICAL FIELD

This invention relates to zoom lenses. Although the invention has general application, it is particularly usable in low cost still photographic cameras.

BACKGROUND ART

U.S. Pat. No. 4,936,661, issued Jun. 26, 1990, to E. I. Betensky et al., describes a zoom lens with a short back focal length and having, from front to rear, negative, positive and negative optical units. The negative unit closest to the image is movable during zooming to provide a majority of the change in focal length. In some of the examples, the front two units move as a single optical group during zooming, and in others they move relative to each other during zooming.

Other similar zoom lenses are shown in U.S. Pat. Nos. 4,836,660 and 4,720,179, issued Jun. 6, 1989 and Jan. 19, 1988, respectively, to Ito; U.S. Pat. No. 4,854,683, issued Aug. 8, 1989, to Ozawa; U.S. Pat. Nos. 4,953,957, issued Sep, 4, 1990, to Kobayashi; 4,889,416, issued Dec. 26, 1989, to Yamada; 4,993,814, issued Feb. 19, 1991, to Hata; 4,787,718, issued Nov. 29, 1988, to Cho; 4,830,476, issued May 16, 1989, to Aoki; and 4,818,081, issued. Apr. 4, 1989, to Ito.

SUMMARY OF THE INVENTION

The lenses shown in the prior Betensky et al. patent have remarkable corrections and compactness for their aperture, zoom range and simplicity. A short back focal length makes them particularly usable as zoom objectives in "viewfinder" (non-SLR) cameras. However, in further reducing the number of elements while maintaining reasonable corrections, aperture and zoom range, it became desirable to rely on the use of aspheric surfaces. The aspheric surfaces are difficult to manufacture in glass elements. Therefore, the reduction in elements was usually consistent with an increase in the number of plastic elements in the lens. While the plastic elements further reduce the cost, they introduce the problem of variation in back focus as their indexes of refraction, radius of curvatures, and thicknesses vary with temperature and relative humidity. This variation in back focus must be either accepted by reducing the aperture to increase the acceptable depth of focus or otherwise compensated for.

It is an object of this invention to provide a zoom lens suitable for use in a low cost still camera, which lens is reasonably well corrected for modest apertures, has a small number of elements and is free of unacceptable back focus shift with normal variations in temperature and relative humidity.

This and other objects are accomplished by a zoom lens covering a half field angle of at least 20°, said lens including, from front to rear, a first positive lens group and a second negative lens group, both of said groups being movable for zooming. The second lens group includes a weak plastic element having at least one aspheric surface. All other elements in the zoom lens are glass. The lens elements having powers and spacings to provide the half angle field coverage of at least 20°.

In accordance to another aspect of the invention, a zoom lens including, from front to rear, a first positive lens group and a rear negative lens group. The first positive lens group consists entirely of a front negative glass component and a rear positive glass component. The components are separated by an aperture stop. The rear negative lens group consists entirely of a front, weak plastic element having an aspheric surface and a rear negative component. All of the elements of the zoom lens except the weak plastic element being glass.

The plastic element is sufficiently weak that it does not contribute substantial focus shift (i.e. a focus shift of no more than ±5%) to the zoom lens under normal variations in temperature and relative humidity. However, because it is plastic, one or more aspheres can be easily molded into it to improve the performance of the zoom lens.

Using this invention, a zoom lens is provided with as few as four elements with a focal length variation of 2 to 1 at relative apertures of f/8 to f/11. The lens is capable of covering a half field angle of at least 20°. At the same time, the zoom lens does not require aspheres on any glass elements and does not have unacceptable focus shift from normal temperature change.

BRIEF DESCRIPTION OF THE DRAWING

The drawing is a side section, partially schematic, of a zoom lens constructed according to the invention.

BEST MODE OF CARRYING OUT THE INVENTION

Zoom lenses constructed according to the invention are set out in detail in Example 1 and illustrated in the drawing. In the example, the "front" of the lens is the object side and the "rear" of the lens is the image side. The radii of curvature $R_1$ to $R_8$, are numbered from front to rear, the thicknesses and spacings for a surface are the thickness or spacing immediately to the rear of that surface. The indexes of refraction $N_e$ are for the mercury e line of the spectrum wavelength and V is the Abbe number.

EFL is the effective focal length. In Table 1A, it is provided for each element and in Table 1C it is provided for the entire zoom lens, BFL is the back focus and F/# is the relative aperture or "f" number. The zoom lens in the drawing is shown in a suitable lens mount 3 with a retaining ring 4 and a spacer 5.

TABLE 1A

| SURFACE | RADIUS | THICKNESS/ SEPARATION | $N_e$ | V | EFL |
| --- | --- | --- | --- | --- | --- |
| $R_1$ | −10.69 | 2.46 | 1.813 | 25.3 | −70.67 |
| $R_2$ | −14.49 | 1.00 | | | |
| $R_3$ | −17.82 | 7.68 | 1.489 | 70.2 | 16.78 |
| $R_4$ | −13.06 | 5.05 | | | |
| $R_5$ | −6.93 | 1.50 | 1.493 | 57.2 | −165.87 |
| $R_6$ | −8.11 | .10 | | | |
| $R_7$ | −17.67 | .50 | 1.697 | 50.5 | −27.79 |
| $R_8$ | −203.84 | 35.92 | | | |

TABLE 1B

| POLYNOMIAL ASPHERES (COEFFICIENTS OF THE EVEN POWERED TERMS) | | | |
| --- | --- | --- | --- |
| SURFACE | AD (4TH) | AE (6TH) | AF (8TH) |
| $R_6$ | 3.7184E-05 | 1.2695E-06 | −1.8130E-08 |
| SURFACE | AG (10TH) | AH (12TH) | AI (14TH) |

TABLE 1B-continued

| | | | |
|---|---|---|---|
| $R_6$ | −3.8821E-11 | 1.3043E-12 | 8.2291E-15 |

TABLE 1C

| | ZOOM DATA | | | |
|---|---|---|---|---|
| POSITION | $R_4$ | BFL | EFL | F/# |
| 1 | 12.69 | 7.27 | 25.57 | 8.0 |
| 2 | 5.05 | 36.52 | 49.22 | 11.0 |

As can be seen from the drawing and the example, the zoom lens is composed of front and rear groups labeled "G1" and "G2", respectively, in the drawings. The two groups move independently for zooming with the primary change in focal length being provided by the rear group.

The front group includes two lens components, a front, weak negative component and a thick, rear positive component. The thick, positive component provides all of the positive power of the lens. The aperture stop is preferably positioned between these two components. As used herein, the term "component" is defined as either a single lens element or a plurality of lens elements cemented together with no air gap between the lens elements forming the defined component.

The rear group, G2, is made up of a strong, negative rear component and a front, very weak plastic element. The plastic element is sufficiently weak that it does not unacceptably affect focus with normal variations in temperature. In the example, the absolute value of the focal length of the plastic element is at least five times that of the entire zoom lens at its wide angle position. The weak, plastic element includes at least one aspheric surface which is used to improve the corrections of the zoom lens across its zoom range without the addition of more elements. For the greatest effect in providing the corrections, the weak, negative element is highly curved, with each surface having a radius of curvature that is less than ⅓ of the focal length of the zoom lens at its wide angle position. All of the other elements in the zoom lens are made of glass.

The front, negative component is also quite weak. Preferably, it has a focal length (absolute value) at least 2½ times that of the zoom lens at its wide angle position.

Utilizing the invention, a well-corrected zoom lens suitable for low cost still camera is provided using as few as four elements.

The invention has been described in detail with particular reference to a preferred embodiment thereof, but it will be understood that variations and modifications can be effected within the spirit and scope of the invention.

I claim:

1. A zoom lens including, from front to rear, a first positive lens group consisting entirely of a front negative glass component and a rear positive glass component, said components being separated by an aperture stop and a rear negative group consisting entirely of a front weak plastic element having sufficiently weak power so that it does not unacceptably affect focus with normal variations in temperature, said plastic element having an aspheric surface and a rear negative component, all of the elements of the zoom lens except said weak plastic element being glass elements.

2. A zoom lens according to claim 1, wherein the absolute value of the focal length of the plastic element is at least 5 times that of the zoom lens at its wide angle position.

3. A zoom lens according to claim 2, wherein the absolute value of the focal length of the front negative component is at least 2½ times that of the zoom lens at its wide angle position.

4. A zoom lens according to claim 1, wherein both groups are moved for zooming with the second group providing most of the change in focal length.

5. A zoom lens according to claim 1, wherein each of the components is a single element.

6. A zoom lens according to claim 1, wherein the absolute value of the radii of curvature of the surfaces of said front weak plastic element are each less than ⅓ of the focal length of the lens at its wide angle position.

7. A zoom lens according to claim 6, wherein said front weak plastic element is meniscus in shape and is convex to the rear.

8. A zoom lens including, from front to rear, a first positive lens group consisting entirely of a front negative lens component and a rear positive lens element, separated by an aperture stop and a rear negative group consisting entirely of a front weak plastic element having sufficiently weak power so that it does not unacceptably affect focus with normal variations in temperature, said plastic element having an aspheric surface and a rear negative component, all of the elements of the zoom lens except said weak plastic element being glass elements.

9. A zoom lens according to claim 8, wherein the absolute value of the focal length of said front weak plastic element is at least 5 times that of the zoom lens at its wide angle position.

10. A zoom lens according to claim 9, wherein the absolute value of the focal length of the front negative component is at least 2½ times that of the zoom lens at its wide angle position.

11. A zoom lens according to claim 8, wherein both groups are moved for zooming with the second group providing most of the change in focal length.

12. A zoom lens according to claim 8, wherein each of the components is a single element.

13. A zoom lens according to claim 8, wherein the absolute value of the radii of curvature of the surfaces of the plastic element are each less than ⅓ of the focal length of the lens at its wide angle position.

14. A zoom lens including, from front to rear, a first positive lens group and a second negative lens group, both of said groups being movable for zooming, said second lens group including a weak plastic element having sufficiently weak power so that it does not unacceptably affect focus with normal variations in temperature, said plastic element having at least one aspheric surface, and all other elements in the zoom lens being glass, wherein the radii of curvatures of said plastic element are each less than ⅓ of the focal length of the lens at its wide angle position.

15. A zoom lens including, from front to rear, a first positive lens group consisting entirely of glass elements including a front negative component and a rear positive component, said rear positive component including no negative lens elements, said front negative and said rear positive components being separated by an aperture stop and a rear negative group consisting entirely of a front weak plastic element having sufficiently weak power so that it does not unacceptably affect focus with normal variations in temperature, said plastic element having an aspheric surface and a rear negative component, all of the elements of the zoom lens except said weak plastic element being glass elements.

16. A zoom lens according to claim 15, wherein the absolute value of the focal length of said front weak plastic element is at least 5 times that of the zoom lens at its wide angle position.

17. A zoom lens according to claim 16, wherein the absolute value of the focal length of the front negative component is at least 2½ times that of the zoom lens at its wide angle position.

18. A zoom lens according to claim 15, wherein both groups are moved for zooming with the second group providing most of the change in focal length.

19. A zoom lens according to claim 15, wherein each of the components is a single element, 20. A zoom lens according to claim 15, wherein the absolute value of the radii of curvature of the surfaces of said front weak plastic element are each less than ⅓ of the focal length of the lens at its wide angle position.

21. A zoom tens according to claim 20, wherein said front weak plastic element is meniscus in shape and is convex to the rear.

22. A zoom lens consisting from front to mar a first negative lens element, a second positive lens element which is biconvex, a third weak plastic lens element having sufficiently weak power so that it does not unacceptably affect focus with normal variations in temperature, and a fourth negative lens element having a concave surface facing said weak plastic lens element.

23. A zoom lens according to claim 22 which has the following numerical data:

| SURFACE | RADIUS | THICKNESS/ SEPARATION | $N_e$ | V | EFL |
|---|---|---|---|---|---|
| $R_1$ | −10.69 | 2.46 | 1.813 | 25.3 | −70.67 |
| $R_2$ | −14.49 | 1.00 | | | |
| $R_3$ | −17.82 | 7.68 | 1.489 | 70.2 | 16.78 |
| $R_4$ | −13.06 | 5.05 | | | |
| $R_5$ | −6.93 | 1.50 | 1.493 | 57.2 | −165.87 |
| $R_6$ | −8.11 | .10 | | | |
| $R_7$ | −17.67 | .50 | 1.697 | 50.5 | −27.79 |
| $R_8$ | −203.84 | 35.92 | | | |

| POLYNOMIAL ASPHERES (COEFFICIENTS OF THE EVEN POWERED TERMS) | | | |
|---|---|---|---|
| SURFACE | AD (4TH) | AE (6TH) | AF (8TH) |
| $R_6$ | 3.7184E-05 | 1.2695E-06 | −1.8130E-08 |
| SURFACE | AG (10TH) | AH (12TH) | AI (14TH) |
| $R_6$ | −3.8821E-11 | 1.3043E-12 | 8.2291E-15 |

| ZOOM DATA | | | | |
|---|---|---|---|---|
| POSITION | $R_4$ | BFL | EFL | F/# |
| 1 | 12.69 | 7.27 | 25.57 | 8.0 |
| 2 | 5.05 | 36.52 | 49.22 | 11.0 |

24. A zoom lens according to claim 22, wherein the absolute value of the focal length of the plastic element is at least 5 times that of the zoom lens at its wide angle position.

25. A wide angle zoom lens covering a half field angle of at least 20°, said lens including, from front to rear, a first positive lens group and a second lens group including a weak plastic element having absolute value of the radii of curvature of each surface less than ⅓ of the focal length of the lens in its wide angle position, said plastic element having at least one aspheric surface, and all other elements in the zoom lens being glass, said lens elements having powers and spacing to provide said ;half field angle coverage of at least 20°.

26. A zoom lens according to claim 25, wherein said weak plastic element has at least one aspheric surface.

27. A zoom lens including, from front to rear, a first positive lens group consisting entirely of a front negative glass component and a rear positive glass component, said components being separated by an aperture stop and a rear negative group consisting entirely of a front weak plastic element having absolute value of the radii of curvature of each surface less than ⅓ of the focal length of the lens in its wide angle position, said plastic element having an aspheric surface and a rear negative component, all of the elements of the zoom lens except said weak plastic element being glass elements.

28. A zoom lens according to claim 27, wherein the absolute value of the focal length of the plastic element is at least 5 times that of the zoom lens at its wide angle position.

29. A zoom lens according to claim 28, wherein the absolute value of the focal length of the front negative component is at least 2½ times that of the zoom lens at Its wide angle position.

30. A zoom lens according to claim 27, wherein both groups are moved for zooming with the second group providing most of the change in focal length.

31. A zoom lens according to claim 27, wherein each of the components is a single element.

* * * * *